March 13, 1945. G. N. HARCOURT 2,371,166
SEALING MEANS
Filed June 12, 1941 3 Sheets-Sheet 1
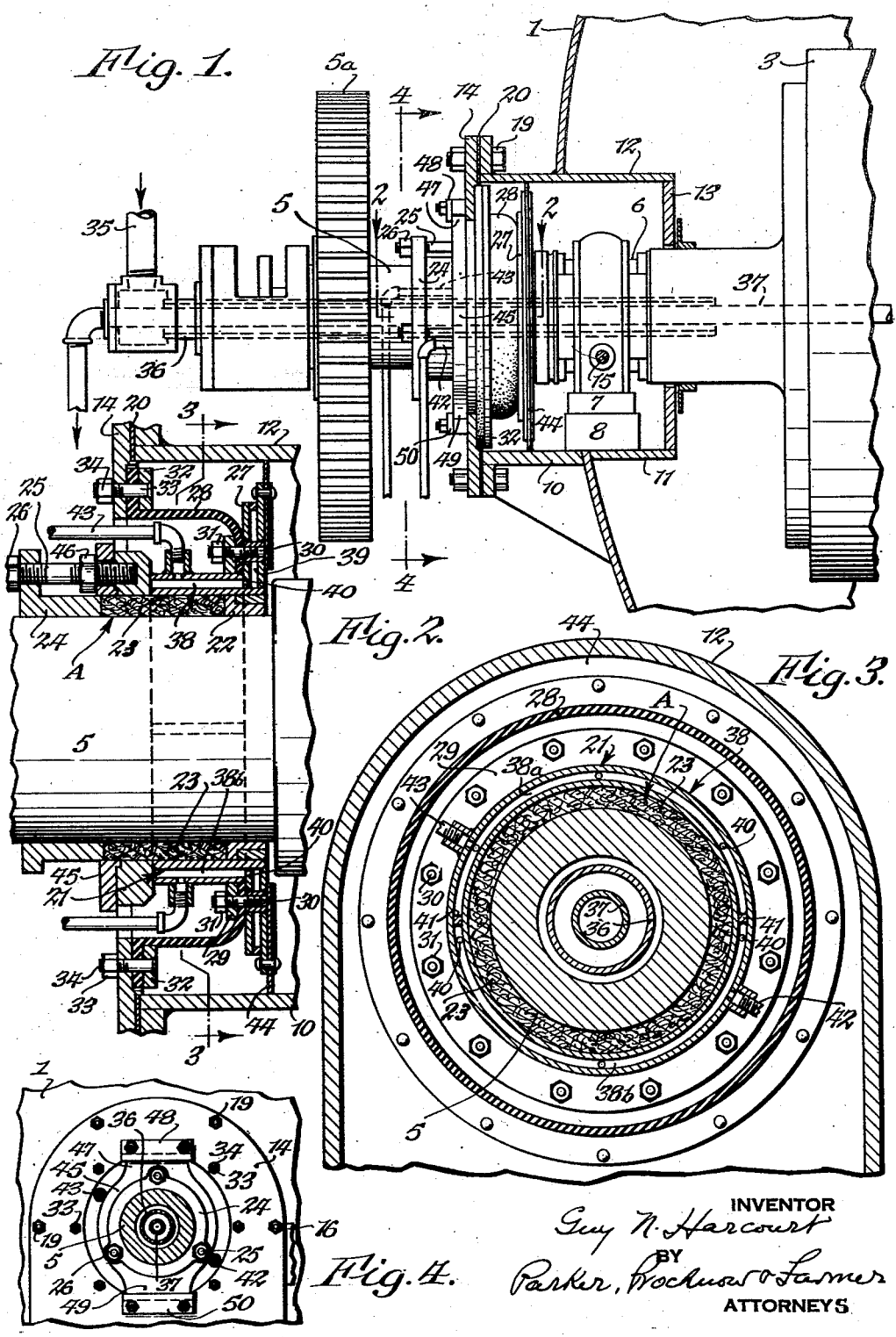
INVENTOR
Guy N. Harcourt
BY
Parker, Brochurs & Farmer
ATTORNEYS March 13, 1945.  G. N. HARCOURT  2,371,166
SEALING MEANS
Filed June 12, 1941  3 Sheets-Sheet 2

INVENTOR
Guy N. Harcourt
BY Parker, Brockway & Farmer
ATTORNEYS

March 13, 1945.  G. N. HARCOURT  2,371,166
SEALING MEANS
Filed June 12, 1941  3 Sheets-Sheet 3

INVENTOR
Guy N. Harcourt
BY
Parker, Rockwood & Farmer
ATTORNEYS

Patented Mar. 13, 1945

2,371,166

UNITED STATES PATENT OFFICE 2,371,166

SEALING MEANS

Guy N. Harcourt, Buffalo, N. Y., assignor to Buffalo Foundry & Machine Co., Buffalo, N. Y.

Application June 12, 1941, Serial No. 397,755

15 Claims. (Cl. 159—12)

This invention relates to fluid tight seals for rotatable shafts where they pass through openings in walls or casings, and more particularly where such shafts are adjustable in directions crosswise of their axes of rotation. In some instances fluid pressure differences exist on opposite sides of such walls or within and without such a casing. For example, in vacuum double drum dryers the pressure within the casing that houses the drying drums is less than outside the casing, and this pressure difference must be maintained even though some of the shafts or trunnions supporting the drums pass outwardly through the walls of the casing to be driven exteriorly thereof. The trunnions of one drum must be adjustable laterally or crosswise of its axis of rotation, when two drums operate in close cooperation and this presents a problem in making an effective seal that also permits such adjustment. If the sealing means uses a thin, flexible or resilient member, it is desirable to relieve that member of torsional stresses to the end that its life be increased and danger of its rupture in use prevented. Devices heretofore provided for this purpose have not been entirely satisfactory.

An object of this invention is to provide an improved and simple seal between rotatable shafts and walls or casings, through which the said shafts pass.

Another object of this invention is to provide an improved seal for shafts passing through a wall separating fluid bodies, which seal will not be subject to torsional strains, which will be fluid tight, regardless of minor lateral or longitudinal movements of the shaft with respect to the wall, and which will be simple, compact, and inexpensive.

Another object of this invention is to provide an improved seal about a rotatable shaft which is adjustable in directions crosswise of its axis of rotation and passes through a casing or wall separating fluid bodies.

A further object of this invention is to provide an improved, simple, durable and effective seal for the trunnion of a vacuum double drum dryer in which the trunnion is adjustable in directions crosswise of its axis and passes through the casing enclosing the drums, and in which the seal will be adequately protected from heat.

Another object of this invention is to provide an improved seal for a rotatable shiftable shaft passing through a wall or casing, which will be amply protected from excessive heat that might cause damage thereto.

Other objects and advantages will be apparent from the following description of an embodiment of the invention, and the novel features will be particularly pointed out hereinafter in connection with the appended claims.

In the accompanying drawings:

Fig. 1 is a side elevation, partially in section, of a device constructed in accordance with this invention, in which the seal is applied to the trunnion of a vacuum drum dryer passing outwardly through the casing thereof;

Fig. 2 is a horizontal sectional view of a seal as applied to a drum dryer trunnion, this section being taken approximately along the line 2—2, Fig. 1.

Fig. 3 is a sectional elevation of a seal as applied to a drum dryer, the section being taken approximately along the line 3—3, Fig. 2;

Fig. 4 is an elevation, partially in section, showing the exterior of the auxiliary housing containing a seal constructed in accordance with this invention, and as applied to the drum dryer, the section being taken approximately on the line 4—4, Fig. 1, but on a smaller scale;

Figure 5:
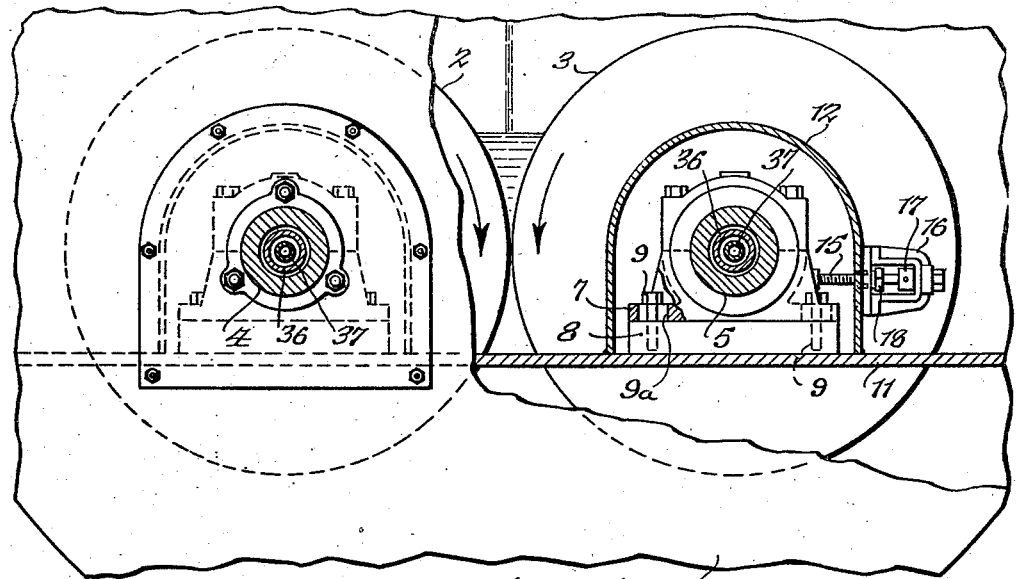
Fig. 5 is a front or end elevation of a drum dryer with part of the casing broken away to illustrate the manner of adjustment of the distance between the drums.
Figure 6:
Fig. 6 is a perspective of a sealing element such as is applied and shown in Figs. 1 and 2, but on a smaller scale.

In the embodiment of the invention illustrated in Figs. 1 to 6, the improved seal is shown applied to a vacuum double drum dryer, but it will of course be understood that according to the broadest interpretation of the invention, the seal can just as effectively be applied to any rotatable shaft passing through a casing or wall. A dryer of this type usually has an outer casing or enclosing wall 1 which is fluid tight, and within which a partial vacuum is maintained. Within the casing 1, a pair of drums 2 and 3, (Fig. 5) are mounted on rotatable trunnions or shafts, such as trunnions 4 and 5. The drums are usually rotated in opposite directions by means of a power driven pinion (not shown) which meshes with a gear secured on each trunnion or shaft, such as the gear 5a, (Fig. 1,) and the liquid to be dried may be applied to the drum surface in any suitable and conventional manner. In Fig. 5, for example, a center feed operation is shown. The trunnions at opposite ends of the drum 3 are adjustable in directions crosswise of their axes, so that the space between the two drums 2 and 3 may be increased or decreased as desired. By changing the distance between the two drums, the thickness of the coating on the two drums, which rotate in opposite directions, with their adjacent surface zones moving downwardly as indicated by the arrows (Fig. 5), may be regulated, and thereby the most efficient and rapid drying of various substances may be effected. This arrangement of the drums and the casing is customary and conventional in the art, and a further general description of the construction and operation of the dryer as a whole will therefore be omitted.

The trunnion 5, which supports the end of the drum 3 adjacent the driving gear 5a, is carried by a bearing 6 of any suitable and conventional construction, which in turn is mounted on a support 7. This support 7 is slidably mounted upon a block or base 8 and is confined thereto by bolts 9. The bolts 9 pass through slots 9a in the support 7 which all extend, or are elongated, in parallel directions crosswise of the axis of rotation of the trunnion. The bolts 9 have smooth shanks adjacent the bolt heads, which slidingly contact the sides of the slot and determine the position of the support in directions lengthwise of the trunnion. The clearances between the bolt heads and shanks and the support 7 are sufficient, however, to enable the support to readily slide on base 8 in directions crosswise of the axis of the trunnion supported thereby when adjustment thereof is attempted.

The block or base 8 which supports the bearing 6 is secured to the casing 1 in any suitable manner, such as by a pair of flanges 10 and 11 extending outwardly and inwardly, respectively, from the end or head of the casing 1 and forming a part thereof. The bearing 6 is disposed in a somewhat box-like housing which encircles the trunnion, and may be formed of the horizontal flanges 10 and 11 and a somewhat cylindrical shell or flange 12, as well as a vertical wall 13 and a housing cap 14. The cap 14 and wall 13 have suitable openings therein through which a trunnion passes, and those openings are of a size to enable adequate crosswise adjustment of this trunnion.

A rotatable screw 15 (Fig. 5) passes through the housing shell 12 and is threaded into the bearing support 7. The screw 15 passes through an eye or opening in a yoke 16 which is secured to and extends outwardly from flange 12. The inner face of the head of screw 15 engages an adjacent face of the yoke, which thereby prevents any movement of the screw toward the trunnion. A collar 17 is secured to the shank of the screw 15 and engages an opposite face of the yoke to thereby prevent outward movement of the screw. Any suitable stuffing box 18, seals the opening between the shank of the screw and the casing 12.

It will thus be seen that merely by rotation of the screw 15 in one direction or the other, the support 7 may be moved in directions crosswise of the axis of rotation of the shaft or trunnion 5. By corresponding adjustments at the opposite ends of the drum 3, this drum may be moved toward or away from the drum 2 to regulate the thickness of the film of material which adheres to the drum surfaces when the dryer is in operation. Control of the film thickness is absolutely necessary to efficient operation of such a dryer, particularly when different materials or materials with different consistencies are to be dried. It will be apparent, however, that such crosswise adjustments of the trunnions to regulate the film thickness can be effectively made in a number of different ways, and the details of the adjustment here described in themselves form no part of the present invention.

In order to maintain a vacuum within the casing, it is essential that an air-tight seal be provided between the trunnion and cover 14 through which the trunnion extends, and this seal must be sufficiently flexible to accommodate the adjustments previously described without in any way admitting air or other fluid which would destroy the vacuum within the casing. It might be noted that the trunnion (not shown) at the opposite end of the drum 3 may be contained entirely within the vacuum casing so that no particular sealing problem is encountered therewith. Cover 14 is removably secured to the housing shell or flange 12 and the flange 10 in any suitable manner, such as by bolts 19. The gasket 20 disposed between the vertical portions of the flange 10 and shell 12, and the cap 14, assures a fluid-tight connection therebetween.

A stuffing box or sealing member, generally designated A in the drawings, of any suitable type, is disposed about trunnion or shaft 5 at one end of the shiftable drum 3, Figs. 1 and 2, adjacent the opening in the cap 14, through which said trunnion passes. In the embodiment shown in Figs. 1—4, the stuffing box comprises a sleeve-like housing member 21, (Figs. 2 and 3) and an annular bushing 22 which fits within the inner end of member 21 and engages the trunnion 5. The sleeve-like member 21 is spaced somewhat from the trunnion 5 over a substantial part of its length and, together with the bushing 22, forms a packing chamber, within which is disposed any suitable compressible packing material 23. An annular sleeve or gland 24 cooperates with the housing member 21 and bushing 22 to compress the packing in the chamber as above described, when it is forcibly drawn towards the sleeve-like member. For this purpose, the gland 24 is provided with a plurality of outwardly extending ears. Studs 25 extend through suitable holes in the ears of the gland, and are fixed to the sleeve member. Suitably threaded nuts 26 engage the outwardly extending ends of the studs 25 and draw the gland toward the sleeve to compress the packing in the chamber, above described. The stuffing box thus formed effectively prevents the flow of gases or liquids along the trunnion into the interior of the vacuum chamber of the dryer.

The member 21, adjacent its inner end, also has an outwardly projecting annular flange 27 which extends entirely around the trunnion 5. In order that the opening between the cap 14 and the member 21 may be effectively sealed, the device is provided with a tubular sealing element 28 (Figs. 1–3 and 6) which telescopes with the trunnion. This element has an inwardly projecting flange at one end thereof and this flange is sealed to the outwardly extending flange 27 of the member 21 by any suitable device, such as a clamping ring 29, and bolts and nuts 30 and 31 which clamp the annular flange of the element 28 against the outwardly extending flange 27. The tubular element 28 has at its other end an outwardly extending, annular flange which is similarly clamped against the inner face of the cap 14 by a clamping ring 32 and bolts and nuts 33 and 34. The element 28 is thereby sealed at one end to the cap 14 continuously and entirely around the opening therein, and at its other end to the sleeve-like sealing member or stuffing box A, continuously and entirely around said trunnion. The element 28 is made of an impermeable and imperforate material and one which is readily deformable, so that an effective seal is provided which closes the opening between the stuffing box and the cap 14. Nevertheless, the element is sufficiently flexible or deformable to accommodate selective adjustment of the trunnion in any direction especially crosswise thereof without in any way breaking the seal between the cap and the trunnion.

It will be understood that various types of sealing elements 28 may be conveniently used, and may be of different materials. In the embodiment illustrated in Figs. 1 and 2, the cup-like element is made of a soft molded rubber. Obviously the seal may be used in applications in which little heat is encountered, or it may be made entirely of a heat-resistant material. However, when a seal made of material such as molded, soft rubber is applied to a drum dryer of the type here considered, in which the drums are heated by steam, often under relatively high pressures, its molded rubber element may suffer serious damage unless adequately protected from excessive heat. In the embodiment of the invention shown in Figs. 1 to 3, for example, steam is admitted to the drum 3 through a passage extending through the trunnion 5. To this effect the device is supplied with steam from any suitable source through an inlet pipe 35 which is connected to a pipe or conduit 36. Pipe 36 extends through the trunnion and admits steam to the interior of the drum 3 in a manner well known in the art, and which it is believed needs no further description here. The condensate or steam outlet pipe 37 also extends through the trunnion 5 within the pipe 36, and serves to conduct out of the drum exhaust steam or condensate. The trunnion, therefore, will be heated by conduction from the drum, to which it is attached, and by radiation and conduction from the various steam pipes passing therethrough, and this heat will be transmitted from the trunnion to the stuffing box and the sealing element 28 in the normal course of events. Applicant has found that if further means are not taken to prevent this conduction of heat from the trunnion to the sealing element 28, the sealing element, when made of soft, molded rubber, for example, will soon be weakened by the excessive heat, and will crack or break down, so that frequent replacement of the element 28 would be necessary. In order to prevent this transmission of heat through the sealing member 28, applicant has provided for the cooling of the stuffing box in a manner which will now be described.

The sealing member 21 is provided with a hollow cooling chamber 38 which extends entirely around the trunnion 5, and the outwardly extending flange 27 is similarly provided with a hollow interior chamber 39 extending entirely around the trunnion 5. A plurality of passages 40 disposed at intervals around the circumference of the trunnion or the member 21 connect the chambers 38 and 39. A pair of baffles 41, Figs. 2 and 3, extend lengthwise of the trunnion across the chamber 38 and divide that chamber into an upper half 38a and a lower half 38b. These two halves of the chamber 38 therefore communicate with each other through the plurality of passages 40 and the chamber 39. A fluid inlet pipe 42 communicates with the lower half 38b of the chamber for the admission of a cooling liquid into that chamber, and a somewhat similar outlet pipe 43 is in communication with the upper half 38a of the chamber 38. A cooling liquid, such as water, is admitted through the pipe 42 into the chamber half 38b, and there circulates in contact with the walls of the stuffing box and cools the same. It then passes through the holes or conduits 40 into the chamber 39 in flange 27 and back again through the holes 40 in the upper part of the element 21 into the upper half 38a of the chamber 38, and thence out through the outlet pipe 43. A fluid cooled stuffing box thus constructed effectively prevents the transfer of the heat from the trunnion 5 to the element 28, and a soft rubber element thus protected from excessive heat from the trunnion will last a long time.

To further protect the element 28 from hot vapors or dust within the vacuum casing, a shield 44 may be secured to the face of flange 27 towards the drum, and extends outwardly toward the walls of the auxiliary housing. This shield is formed of heat insulating and resisting material, preferably of wire woven asbestos, and is sufficiently flexible to allow the crosswise adjustments of the position of the trunnion without causing a substantial gap between the outer edges of the shield and the walls of the housing.

In order that the stuffing box may be held against rotation, so that the strains which might develop from the frictional contact of the stuffing box with the rotating trunnion 5 will not be transmitted to the flexible or deformable element 28, the device is provided with a front plate 45 which is secured to the member 21 by means of the studs 25, previously described, which also pass through suitably disposed holes in the plate 45. Nuts 46 are threaded on the shanks of the studs and secure the plate 45 to the member 21. The plate 45 has an upwardly projecting end 47, and the edge of this projecting end is substantially flat and straight, and extends horizontally crosswise of the housing. The cap 14 has secured thereto a grooved guide member 48 which slidably engages the upper end 47 of the plate 45 and prevents rotation of said plate with the trunnion, but nevertheless allows the crosswise movement of said plate and the stuffing box secured thereto, so that lateral adjustments of the trunnion as hereinabove described will not be obstructed. Similarly, the plate 45 has a downwardly projecting end 49 which engages a similar guide 50 secured to the lower portion of the housing cap 14.

The plate 45 preferably does not entirely close the opening between the cap 14 and the trunnion or sealing member, and in the embodiment of the invention shown in Figs. 1-4, there is a substantial aperture between the sides of the plate 45 and the housing cap 14 which permits circulation of air against the inner face of the sealing element 28. Such circulation also contributes to the cooling of that member and element.

The operation of this embodiment of the invention may now be described as follows.

The trunnion 5 and drum 3 of the drum dryer are driven by means of the gear 5a and a power-operated pinion, not shown, in the usual manner well known in the prior art. Steam is supplied to the drum through the steam inlet 35 and pipe 36 passing through the trunnion, and exhaust steam or condensate are withdrawn through the pipe 37 from the drum; also passing outwardly through the trunnion. The trunnion 5 and drum 3 may be adjusted in directions crosswise of the trunnion, and generally horizontal, by manipulation of the screw 15, and the drum 3 may be thereby moved toward or away from the drum 2. Since the inside of the casing is under vacuum, there is a tendency for air or perhaps other fluids to enter the casing along the rotating shaft or trunnion 5, and this is prevented by means of the stuffing box comprising the member 21, the packing 23 and gland 24. The opening between the stuffing box and the cap or housing 14 is closed by the impermeable, deformable element 28 which is sealed to the cap 14 and to the stuffing box. This element 28 prevents the flow of air about the stuffing box and between the stuffing box and the housing cap into the casing, and as the position of the trunnion is adjusted, this sealing element 28 flexes or is deformed slightly and thus accommodates such adjustment without breaking the seal or allowing the entry of air which might destroy the vacuum within the casing. Water or other cooling fluid is, of course, admitted through the inlet pipe 42 and circulates through the member 21 to coil the same and prevent the transmission of heat from the trunnion to the element 28, which might tend to injure or destroy it. The device is therefore exceedingly effective in providing a tight seal about the trunnion 5, which may nevertheless be shifted and adjusted without in any way destroying the vacuum within the casing 1.

Figure 7:
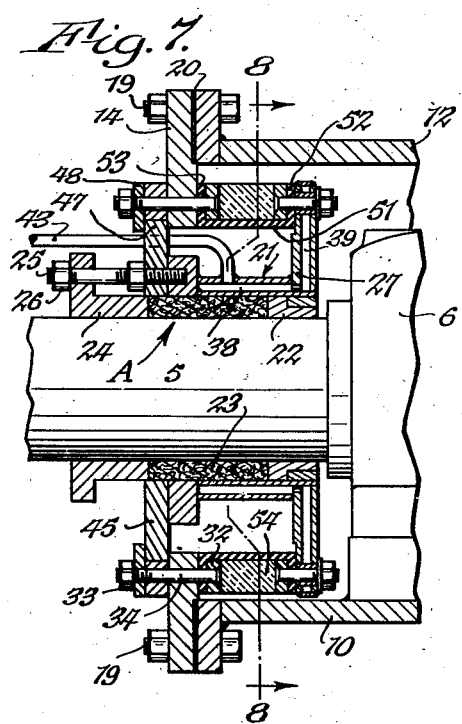
Fig. 7 is an approximately horizontal sectional view of another type of seal constructed in accordance with this invention, and applied to a drum dryer similarly as in Fig. 1.
Figure 8:
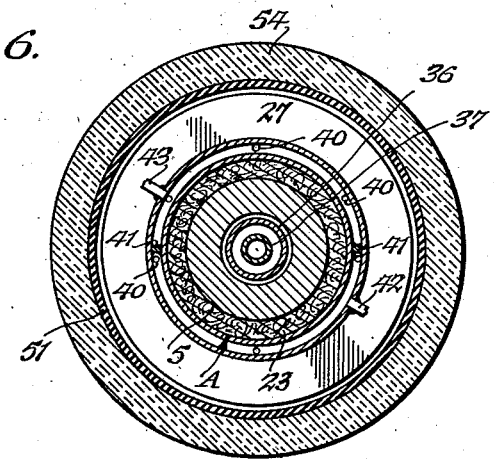
Fig. 8 is a sectional elevation of the device shown in Fig. 7, the section being taken approximately along the line 8—8 of Fig. 7.
Figure 9:
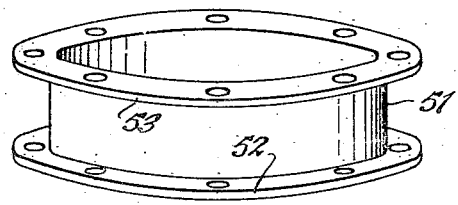
Fig. 9 shows in perspective a sealing element, such as embodied in the seal shown in Fig. 8.

It will be obvious that this invention may be applied in a variety of ways, and in Figs. 7-9 a modification of the above described structure is shown. Insofar as is practical, the same numerals will be applied to corresponding parts of the modified structure as have been heretofore applied in Figs. 1-6.

The embodiment shown in Figs. 7-9 also has a housing comprising the flanges 10 and 12, a housing cap 14 and a water cooled stuffing box comprising the water cooled sleeve-like member 21, gland 24 and bushing 22. The device differs from the previously described device, however, in that instead of having a cup-shaped tubular element sealing the gap between the upwardly extending flange 27 of the member 21 and the cap 14, the Fig. 7 embodiment has a deformable, flexible, tubular, annular sealing element 51, having a somewhat U-shaped cross section with outwardly extending flanges 52 and 53 extending entirely and continuously around the trunnion 4. These outwardly extending flanges are sealed respectively to an outer peripheral zone of the flange 27 continuously and entirely around the trunnion and to an inner face of the cap 14 continuously and entirely around the opening therein through which the trunnion extends. The sealing element may be made of suitable, flexible material, such as the soft rubber in the previously described embodiment, and it will be obvious that it will act in substantially the same way to seal the opening between the stuffing box and the cap, and will deform, flex or yield slightly to accommodate adjustments of the trunnion. This device is also provided with a plate 45 and guide means which prevent rotation of the stuffing box and the transmission of rotational strains to the sealing element 41. The stuffing box and flange 27 are similarly water cooled, as in the previously described structure. The sealing element is further protected by a ring of suitable heat insulating material 54, such as rock wool, which is disposed about the element between the outwardly extending flanges thereof, and which thereby protects the element from direct heat from the interior of the casing, such as from the hot gases and vapors within the casing 1 and around the drum.

Figure 10:
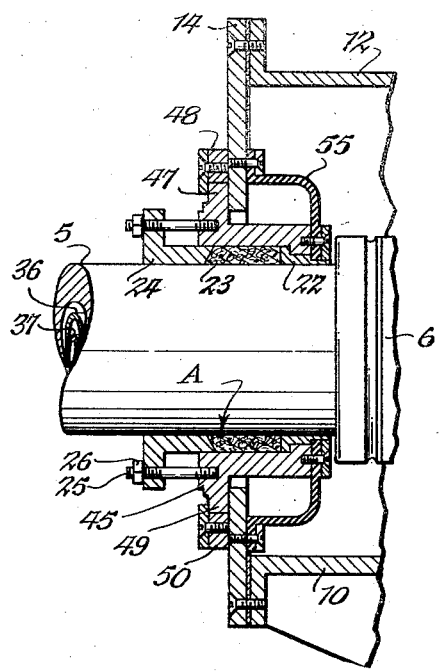
Fig. 10 is a sectional elevation of another type of seal constructed in accordance with this invention.

Another embodiment of the invention is shown in Fig. 10, in which protection of the seal against heat is omitted. Such a device is practical if the sealing element is constructed of a heat-resistant material, or if the sealing device is applied to an unheated shaft passing through a wall member or casing separating zones of unequal pressure or various bodies of fluid or other material. The device thus shown is extremely effective and operates in substantially the same way as devices previously described. It should be noted, however, that the sealing element 55, Fig. 10, extends inwardly from the cap 14 toward the stuffing box, and that the sealing element 55 is bent toward the fluid body under lower pressure. In other words, the body of higher pressure is in contact with the concave side of the sealing element, and the body of lower pressure is on the convex side of the sealing element.

Figure 11:
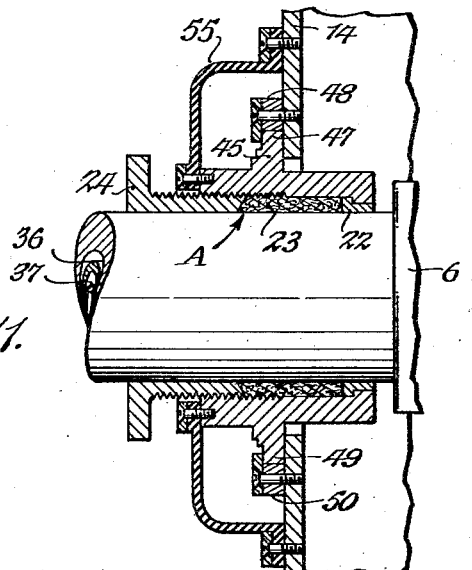
Fig. 11 is a sectional elevation of a sealing device also constructed in accordance with this invention, and particularly useful where the pressures within the casing are higher than the pressures outside of the casing.

There are obviously many applications in which the body of fluid within the casing would be under the higher pressure and, in that event, the seal may be reversed as shown in Fig. 11, so that the tubular or cup-shaped element will extend from the cap or wall 14 outwardly away from the casing towards the sealing member and, as before, the sealing element will be bent toward the body having the lower pressure. This construction is of particular advantage with a cup-shaped member, as shown, since, the stresses on the deformable element will tend to bend it further in the direction in which it is already bent, and will not tend to wrinkle it or substantially distort its shape.

Various types of sealing elements may be used in place of the molded rubber here shown as the preferred form, such as metal corrugated bellows, various membranes, or other types of material or structures sufficiently deformable and yet imperforate and impermeable to penetration by fluids.

It will be obvious that various other changes and modifications of the embodiments of the invention herein described and illustrated in order to explain the nature of the invention, may be made by those skilled in the art within the principle and scope of the invention as expressed in the appended claims.

I claim as my invention:

1. In a device having a wall separating zones of unequal fluid pressure with a passage therethrough, and a rotatable element having a supporting trunnion extending along said passage from one of said zones to the other and adjustable in a direction crosswise of its axis of rotation, the improved seal for preventing fluid movement through said passage and along said shaft, which comprises a fluid cooled stuffing box disposed about said trunnion and preventing fluid leakage along said trunnion, guide means secured to said wall and slidingly contacting said stuffing box and preventing rotation thereof with said trunnion, a deformable, impermeable, tubular element telescoping said trunnion, said element being sealed at one end to said stuffing box continuously and entirely around said trunnion, and at its other end to said wall continuously and entirely about said passage, said cooled stuffing box having a flange extending outwardly of said trunnion towards the periphery of said passage, and a shield of heat insulating material secured to said flange and extending outwardly from said trunnion towards the periphery of said passage.

2. In a device having a wall separating zones of unequal fluid pressure with a passage therethrough, and a rotatable element having a supporting trunnion extending along said passage from one of said zones to the other and adjustable in a direction crosswise of its axis of rotation, the improved seal for preventing fluid movement through said passage and along said shaft, which comprises a fluid cooled stuffing box disposed about said trunnion and preventing leakage along said trunnion, guide means secured to said wall for slidingly contacting said stuffing box and preventing rotation thereof with said trunnion, a deformable, impermeable, sleeve-like element telescoping said trunnion within said passage, said element having a radially extending flange at each end thereof, means for sealing one of said flanges to said wall continuously and entirely about said passage, and means for sealing the other of said flanges to said stuffing box continuously and entirely about said trunnion, an annular member of heat insulating material disposed about one side of said element between said flanges, and means for freely exposing to the atmosphere the other side of said element.

3. In a device having a wall member separating zones of unequal fluid pressure and a rotatable shaft adjustable in a direction crosswise of its axis of rotation and passing through said member from one of said zones to the other, the improved seal for preventing fluid flow along said shaft between said zones which comprises a stuffing box mounted about said shaft and movable with said shaft in its said crosswise adjustment, a flexible, sleeve-like collar loosely encircling said shaft and having an aperture through which said shaft extends and which is sealed to said box peripherally continuously about said aperture, and to said wall member peripherally continuously about said shaft, having at one end a circumferential portion secured in sealed engagement with said stuffing box and at the other end a circumferential portion in sealed engagement with said wall member adjacent said shaft, whereby fluid flow lengthwise of said shaft from one zone to the other is substantially prevented in all relative positions of said shaft and member, and a partition wall extending in a direction between the inner end portion of said box and said wall member to shield said collar largely from heat on one side of said wall member.

4. In a device having a wall member separating zones of unequal fluid pressure and a rotatable shaft adjustable in a direction crosswise of its axis of rotation and passing through said member from one of said zones to the other, the improved seal for preventing fluid flow along said shaft between said zones which comprises, a stuffing box mounted about said shaft and movable with said shaft in its said crosswise adjustment, a cup shaped tubular element loosely telescoping said shaft, and having at one end thereof a peripherally continuous flange encircling said shaft and clamped against said stuffing box and at the other end thereof a peripherally continuous flange clamped against a continuous zone of said wall member around said opening, said tubular element being impermeable and deformable to provide a fluid tight seal between said wall member and said shaft in various adjusted positions of said shaft, and a partition wall extending in a direction between the inner end portion of said box and said wall member to shield said collar largely from heat on one side of said wall member, said partition wall having a flexible portion to largely span the space from said box to said wall member but yield when said shaft is adjusted crosswise of its axis of rotation.

5. In an improved sealing device having separating zones of unequal fluid pressure and a rotatable shaft passing through an opening in said wall from one of said zones to the other and adjustable in a direction crosswise of its axis of rotation, the improved seal for preventing fluid flow through said opening from one said zone to the other, which comprises a sealing member encircling said shaft and having a substantially fluid tight but movable contact therewith, an element also encircling said shaft and having a fluid tight, continuous seal to said sealing member entirely around said shaft, and another and similar seal to said wall member entirely around said opening, said element being deformable to adjust itself automatically to said movements of said shaft in directions crosswise of said axis while remaining sealed to said wall and sealing member, means for preventing rotation of said sealing member with said shaft and guiding it in movements in directions crosswise of said shaft, and means largely spanning the space between the inner end portion of said sealing member and said wall member to shield said element substantially from heat at the side adjacent said spanning means.

6. In a device having a wall separating zones of unequal fluid pressure and a rotatable element having a supporting trunnion adjustable in a direction crosswise of its axis of rotation and passing through an opening in said wall from one of said zones to the other, the improved seal for preventing fluid flow along said shaft and through said wall from one zone to the other, which comprises a sealing member into which said trunnion extends and which provides a seal along the surface of said trunnion as said trunnion rotates, a deformable, impermeable element of a material which may be weakened by excessive heat sealed to said sealing member continuously and entirely around said trunnion, and to said wall continuously and entirely around said opening, means for cooling said sealing member and partition means shielding said element from heat at one side of said wall for protecting said sealing member from transmission thereto of excessive heat.

7. In a device having a wall separating zones of unequal fluid pressure and a rotatable element having a supporting trunnion adjustable in a direction crosswise of its axis of rotation and passing through an opening in said wall from one of said zones to the other, the improved seal for preventing fluid flow along said shaft and through said wall from one zone to the other, which comprises a sealing member into which said trunnion extends and which provides a seal along the surface of said trunnion as said trunnion rotates, a soft rubber tubular element sealed to said sealing member continuously and entirely around said trunnion, and to said wall continuously and entirely around said opening, means for cooling said sealing member and flexible partition means for shielding said sealing member from transmission thereto of excessive heat from one side of said wall.

8. In a device having a wall separating zones of unequal fluid pressure and a rotatable element having a supporting trunnion adjustable in a direction crosswise of its axis of rotation and passing through an opening in said wall from one of said zones to the other, the improved seal for preventing fluid flow along said shaft and through said wall from one zone to the other which comprises a sealing member into which said trunnion extends and which provides a seal against leakage along the surface of the trunnion as said trunnion rotates, a deformable impermeable element sealed to said sealing member continuously and entirely around said trunnion, and to said wall continuously and entirely around said opening, whereby said impermeable element is deformed without breaking its sealed connections to said wall and seal sealing member when adjustment of said trunnion occurs, and a shield of heat insulating material disposed at one side of said wall and shielding said element from direct heat of the atmosphere at one side of said wall.

9. An improved vacuum drum drier comprising a closed casing in which a partial vacuum is maintained in use, a pair of drums disposed closely side by side entirely within said casing and rotatable about parallel axes, one of said drums having trunnions extending from the ends thereof, bearings for said trunnions shiftable in directions crosswise of the axes of rotation of said trunnions to move said one drum toward and from the other, means accessible from the exterior of the casing and operable on said bearings to shift them and said trunnions in said directions, said casing having an opening outwardly therefrom at one end and through which one of said trunnions extends to the exterior of the casing, a stuffing box through which said one trunnion extends and which prevents leakage along the trunnion as that trunnion rotates, means securing said box to said casing for sliding movement in said directions and preventing rotation of said box with said trunnion, and a deformable, impermeable element sealed to said box continuously and entirely around said trunnion and to said casing entirely and continuously around and in proximity to said opening, but entirely at one side of said box securing means, whereby said one drum may be adjusted toward and from said other drum without breaking the vacuum in said casing or stopping rotation of the drums, said deformable member will be free of torsional stresses, and the atmospheric pressure will be the same on both sides of said box securing means.

10. An improved vacuum drum drier comprising a closed casing in which a partial vacuum is maintained in use, a pair of heated drums disposed closely side by side entirely within said casing and rotatable about parallel axes, one of said drums having trunnions extending from the ends thereof, bearings for said trunnions shiftable in directions crosswise of the axes of rotation of said trunnions to move said one drum toward and from the other, means accessible from the exterior of the casing and operable on said bearings to shift them and said trunnions in said directions, said casing having an opening outwardly therefrom at one end and through which one of said trunnions extends to the exterior of the casing, a stuffing box through which said one trunnion extends and which prevents leakage along the trunnion as that trunnion rotates, means securing said box to said casing for sliding movement in said directions and preventing rotation of said box with said trunnion, a deformable impermeable element sealed to said box continuously and entirely around said trunnion and to said casing entirely and continuously around and in proximity to said opening but entirely at one side of said box securing means, whereby said one drum may be adjusted toward and from said drum without breaking the vacuum in said casing or stopping rotation of the drums, said deformable member will be free of torsional stresses, and the atmospheric pressure will be the same on both sides of said box securing means, and a shield of heat insulating material extending from said box approximately to the casing wall to shield said deformable element from the heat within said casing.

11. An improved vacuum drum drier comprising a closed casing in which a partial vacuum is maintained in use, a pair of heated drums disposed closely side by side entirely within said casing and rotatable about parallel axes, one of said drums having trunnions extending from the ends thereof, bearings for said trunnions shiftable in directions crosswise of the axes of rotation of said trunnions to move said one drum toward and from the other, means accessible from the exterior of the casing and operable on said bearings to shift them and said trunnions in said directions, said casing having an opening outwardly therefrom at one end and through which one of said trunnions extends to the exterior of the casing, a stuffing box through which said one trunnion extends and which prevents leakage along the trunnion as that trunnion rotates, means securing said box to said casing for sliding movement in said directions and preventing rotation of said box with said trunnion, a deformable, impermeable element sealed to said box continuously and entirely around said trunnion and to said casing entirely and continuously around and in proximity to said opening, but entirely at one side of said box securing means, whereby said one drum may be adjusted toward and from said drum without breaking the vacuum in said casing or stopping rotation of the drums, and said deformable member will be free of torsional stresses, the atmospheric pressure will be the same on both sides of said box securing means, and means for cooling said box to prevent transfer of heat to said deformable element from said drum through said box.

12. An improved vacuum drum drier comprising a closed casing in which a partial vacuum is maintained in use, a pair of heated drums disposed closely side by side entirely within said casing and rotatable about parallel axes, one of said drums having trunnions extending from the ends thereof, bearings for said trunnions shiftable in directions crosswise of the axes of rotation of said trunnions to move said one drum toward and from the other, means accessible from the exterior of the casing and operable on said bearings to shift them and said trunnions in said directions, said casing having an opening outwardly therefrom at one end and through which one of said trunnions extends to the exterior of the casing, a stuffing box through which said one trunnion extends and which prevents leakage along the trunnion as that trunnion rotates, means covering a portion only of said casing opening and securing said box to said casing for sliding movement in said directions and preventing rotation of said box with said trunnion, a deformable impermeable element sealed to said box continuously and entirely around said trunnion and to said casing entirely and continuously around and in proximity to said opening, whereby the atmospheric pressure on said box securing means will be balanced on both faces of that means, and said one drum may be adjusted toward and from said drum without breaking the vacuum in said casing or stopping rotation of the drums, and said deformable member will be free of torsional stresses, a shield of heat insulating material extending from said box approximately to the casing wall to shield said deformable element from the heat within said casing, and means for cooling said box to prevent transfer of heat to said deformable element from said drum through said box.

13. An improved vacuum drum drier comprising a closed casing in which a partial vacuum is maintained in use, a pair of heated drums disposed closely side by side entirely within said casing and rotatable about parallel axes, one of said drums having trunnions extending from the ends thereof, bearings for said trunnions shiftable in directions crosswise of the axes of rotation of said trunnions to move said one drum toward and from the other, means accessible from the exterior of the casing and operable on said bearings to shift them and said trunnions in said directions, said casing having an opening outwardly therefrom at one end and through which one of said trunnions extends to the exterior of the casing, a stuffing box through which said one trunnion extends and which prevents leakage along the trunnion as that trunnion rotates, means covering a portion only of said opening and securing said box to said casing for sliding movement in said directions and preventing rotation of said box with said trunnion, a deformable, impermeable element sealed to said box continuously and entirely around said trunnion and to said casing entirely and continuously around and in proximity to said opening, whereby the atmospheric pressure on said box securing means will be balanced on both faces of that means, and said one drum may be adjusted toward and from said drum without breaking the vacuum in said casing or stopping rotation of the drums, and said deformable member will be free of torsional stresses, and means within the casing between said element and the portion of the chamber of the casing in which said drums are disposed for shielding the deformable element from the connection and radiant heat within said casing.

14. An improved vacuum drum drier comprising a closed casing in which a partial vacuum is maintained in use, a pair of heated drums disposed closely side by side entirely within said casing and rotatable about parallel axes, one of said drums having trunnions extending from the ends thereof, bearings for said trunnions shiftable in directions crosswise of the axes of rotation of said trunnions to move said one drum toward and from the other, means accessible from the exterior of the casing and operable on said bearings to shift them and said trunnions in said directions, said casing having an opening outwardly therefrom at one end and through which one of said trunnions extends to the exterior of the casing, a stuffing box through which said one trunnion extends and which prevents leakage along the trunnion as that trunnion rotates, means covering a portion only of said opening and for securing said box to said casing for sliding movement in said directions and preventing rotation of said box with said trunnion, a deformable, impermeable element sealed to said box continuously and entirely around said trunnion and to said casing entirely and continuously around and in proximity to said opening, whereby the atmospheric pressure on said box securing means will be balanced on both faces of that means, and said one drum may be adjusted toward and from said drum without breaking the vacuum in said casing or stopping rotation of the drums, and said deformable member will be free of torsional stresses, and means within the casing between said element and the portion of the chamber of the casing in which said drums are disposed for shielding the deformable element from the atmospheric and radiant heat within said casing and for cooling said box and element.

15. An improved vacuum double drum drier comprising a closed casing having a chamber in which a partial vacuum is maintained in use, a pair of drums disposed closely side by side fully within said chamber and rotatable about parallel axes, one of said drums having trunnions extending from the ends thereof, bearings within said chamber and rotatably supporting said trunnions, means mounting said bearings for movement in directions crosswise of the axes of rotation of the trunnions to move said one drum bodily toward and from the other, means entering said chamber through sealed passage means and accessible from the exterior of said chamber and operable on said bearings to shift them and said trunnions in said directions so as to move said one drum toward and from the other, said casing having an opening outwardly from said chamber at one end and through which one of said trunnions extends to the exterior of said chamber, a stuffing box through which said one trunnion extends and which prevents leakage along the trunnion as that trunnion rotates, means for covering a portion only of said opening and securing said box to said casing for movement in directions parallel to the directions of adjustment of said bearings, and a deformable, impermeable element sealed at different zones thereof to said box and to said casing continuously and entirely around and in proximity to said box and said opening for preventing leakage through sad opening to said chamber, whereby said one drum may be adjusted toward and from the other drum without breaking or changing the vacuum in said chamber or stopping of rotation of said drums, said impermeable element being disposed entirely at one side of said means for securing said box to said casing, whereby the atmospheric pressure on said box securing means will be balanced on both faces of that means and will offer no resistance to movement of said one drum toward and from the other while a vacuum exists in said chamber.

GUY N. HARCOURT.